United States Patent [19]

Kolobow et al.

[11] 3,969,240
[45] July 13, 1976

[54] POLYSILOXANE MEMBRANE LUNG

[75] Inventors: Theodor Kolobow, Rockville, Md.;
Fusakazu Hayano, Tokyo, Japan;
Paul Weathersby, Rockville, Md.

[73] Assignee: The United States of America as represented by the Department of Health, Education and Welfare, Washington, D.C.

[22] Filed: Feb. 3, 1975

[21] Appl. No.: 546,786

[52] U.S. Cl. .................. 210/22 A; 23/258.5 M; 210/321 B
[51] Int. Cl.² .................. B01D 31/00; B01D 13/00
[58] Field of Search .......... 23/258.5; 428/429, 448; 210/321, 22

[56] References Cited

UNITED STATES PATENTS

| | | | |
|---|---|---|---|
| 3,489,647 | 1/1970 | Kolobow | 23/258.5 X |
| 3,579,540 | 5/1971 | Ohlhausen | 428/429 X |
| 3,619,256 | 11/1968 | Pepe et al. | 428/429 |
| 3,749,593 | 7/1973 | Keiser | 428/448 X |

*Primary Examiner*—Frank A. Spear, Jr.
*Attorney, Agent, or Firm*—Browdy and Neimark

[57] ABSTRACT

A polydimethylsiloxane gum without silica filler is applied to silicone rubber membranes for use in a membrane lung.

7 Claims, No Drawings

POLYSILOXANE MEMBRANE LUNG

FIELD OF THE INVENTION

The present invention relates to rubber membranes for use in membrane lungs and in particular to a coating of polydimethylsiloxane gum without silica filler which is applied to the silicone rubber membrane for improved blood compatibility properties.

BACKGROUND OF THE INVENTION

In the field of artificial membrane lungs, silicone rubber is used as a membrane due to its excellent gas permeability and good blood compatibility. The most serious drawbacks to the use of such lungs for long-term extracorporeal perfusion, are bleeding related to anti-coagulation and perfusion anemia. Standard silicone rubber (SSR) presently used in membrane lungs as shown in the patent to Kolobow (U.S. Pat. No. 3,489,647), however, contains silica filler.

In KOLOBOW '647 there is disclosed an artificial organ for membrane dialysis of biological fluids. Exemplified are an artificial lung and an artificial kidney, as well as processes for carrying out the functions of these artificial organs. A generic process is disclosed of adding to or removing from a body fluid (e.g., blood) a biologically active material (e.g., impurities in the blood normally released to the lungs or the kidneys) by dialysis through a membrane wherein the body fluid is passed over one side of a permeable membrane and the biologically active material diffuses through the membrane.

Substantially defect-free organo polysiloxane films are known as shown in the patent to Robb (U.S. Pat. No. 3,325,330) the specification of which discloses a process for making such films. However, Robb discloses some filler material used with a lower limit of 0.1 parts of filler per one part of organo polysiloxane by weight. The patent to Robb does not indicate that such substantially defect-free organo polysiloxane films may have a better blood compatibility than SSR blood contacting surfaces.

Similarly, the Gajewski et al U.S. Pat. No. 3,759,788 discloses an organic plastic material for use in improving the antithrombogenic characteristics of artificial kidneys and other organ perfusion devices. The disclosure of Gajewski et al indicates that fillers are a contemplated ingredient of their organic plastic and in the examples shown finely divided silica filler is used.

SUMMARY OF THE INVENTION

It has now been discovered that the silica filled SSR heretofore used has the aforementioned drawbacks because of the presence of the silica filler which adversely affects the blood compatibility of the SSR.

By preparing silicone rubber membranes and tubing used in membrane lungs with blood contacting surfaces being made of a filler-free silicone rubber (FFSR), improved blood compatibility, i.e., thromboresistance, of the surface is achieved. In particular, a polydimethylsiloxane gum without silica filler improves blood compatibility properties. When a surface of this gum is coated on a membrane and in tubing used in the membrane lung, it permits venovenous by-pass with less anti-coagulant than with surfaces containing silica filler.

It is therefore an object of the present invention to eliminate the drawbacks of the prior art of blood contacting surfaces used in membrane lungs.

It is an additional object of the present invention to provide an improved membrane lung.

It is a further object of the present invention to provide improved venovenous by-pass while at the same time requiring lower heparin doses than previously employed in membrane lungs of the prior art.

The above and other objects of the present invention are accomplished by providing a superior hypothrombogenic surface consisting of silicone elastomer, e.g. polydimethylsiloxane gum, without silica filler, which has particular application in the coating of blood contacting surfaces of the membranes and tubing used in a membrane lung.

DETAILED DESCRIPTION OF THE PREFERRED EMBODIMENT

A polydimethylsiloxane gum without silica filler, which is suitable for dispersion casting of zero defect silicone rubber membranes is used according to the present invention for the improvement of blood compatibility of blood contacting surfaces, such as membranes and tubing used in a membrane lung. In order to eliminate serious drawbacks to long-term extracorporeal perfusion, such as bleeding related to anti-coagulation and perfusion anemia, membrane lungs and the tubing associated therewith are produced with the blood contacting surfaces being made of a silicafree silicone rubber.

Such filler-free silicone rubber (FFSR) blood contacting surfaces have been compared in performance with comparable components of membrane lungs made from standard silicone rubber (SSR). FFSR surfaces were initially tested by coating a glass test tube and testing for the Lee-White clotting time. Use of a FFSR surface gave a Lee-White clotting time of 40 minutes as compared to 20 minutes for SSR surfaces.

The FFSR may be fabricated into membrane lungs or other blood contacting components in accordance with conventional practice such as shown in the Kolobow U.S. Pat. No. 3,489,647. Silicone elastomers free of fillers may be formed into membranes in accordance with the procedure of the Robb U.S. Pat. No. 3,325,330.

Besides the preferred polydimethylsilicone gum free of filler, other silicone elastomers may be used as the FFSR. Thus, silicone elastomers containing polymer units such as phenylmethylsiloxane, 3,3,3-trifluoroproxylmethylsiloxane, methyl hydrogensiloxane and/or methylvinylsiloxane may also be used without filler.

In general, devices formed of the FFSR may comprise tubing and containers for the transport and holding of blood, for example, in conjunction with artificial organs such as artificial hearts, organ perfusion devices, heart-lung machines and artificial kidneys or other blood contacting parts used therein such as membranes. Structural blood contacting parts of such devices and their subsystems such as heat exchanger assemblies can also be made in accordance with this invention. The devices of this invention can also constitute catheters for temporary implantation in the body as well as other medical and surgical devices.

The medical devices using FFSR of this invention have superior antithrombogenic characteristics. Moreover, the superior antithrombogenic characteristics of such devices are normally not lost because of the degradation of any surface coating such as heparin because such devices are inherently highly antithrombogenic without the use of any surface coating. Thus, the devices can be brought into contact with blood to perform their intended function with reduced clotting at their surfaces.

The following examples are for illustrative purposes only, and not intended to limit the scope of this invention.

EXAMPLE 1

An uncured silicone elastomer stock is prepared from 100 parts by weight of a commercial dimethylpolysiloxane elastomer grade gum and 1.5 parts by weight of 2,4-dichlorobenzoyl peroxide as a curing catalyst. This formulation is milled until thoroughly mixed, extruded into tubing having an inner diameter of 0.113 inch, cured for 5 minutes at 200° to 220°F, and postcured for 4 hours at 310°F.

EXAMPLE 2

When 100 parts by weight of a commercial silicone elastomer stock, based on a polymer comprising dimethylsiloxane units and 3,3,3-trifluoropropylmethylsiloxane units, are used without silica filler, tubing, and other medical devices made from the resulting mixture exhibit improved antithrombogenic characteristics when compared with the same silicone elastomer stock to which silica filler has been added.

EXAMPLE 3

Membrane lungs were formed according to the Kolobow U.S. Pat. No. 3,489,647. Some of these were provided, as has previously been conventional, with SSR on the blood contacting surfaces, while others were provided with FFSR blood contacting surfaces.

The uses of membrane lungs and perfusion circuit tubing coated with FFSR on the blood contacting surfaces were tested by performing venovenous by-pass for up to 10 days in sheep with lower heparin doses than employed with SSR surfaces. Sheep were heparinized with 500/kg. and venovenous by-pass begun with a 0.8 m² spiral membrane lung using heparinized (8 u/cc) Ringers prime. Maintenance heparin was 70 u/kg (hr) or 50% less than with the standard perfusion technique using SSR surfaces. Blood flow was 600 cc/min. and the membrane lung was ventilated with 700 cc/min. of 25–45% $O_2$ and 2.5–5% $CO_2$.

There was found to be no initial rise in resistance across the membrane lung and perfusion pressure remained constant and low throughout the perfusion (30–45 mm Hg). Gas exchange remained high with the outflow saturation being over 95%, and there was no deterioration with time. There was no perfusion anemia. The platelet count fell initially 40–60% and then remained steady (400,000–800,000/mm³). From these results it can easily be seen that the perfusion systems blood contacting surfaces of FFSR have improved blood compatibility.

EXAMPLE 4

Two groups of sheep underwent AV by-pass with 0.6 m² spiral membrane lungs. In one group, the study group, blood contacting surfaces of FFSR were used and in the second group, the control group, blood contacting surfces were of SSR. All of the animals tested were heparinized at the time of cannulation but received no heparin after bypass was begun. Heparinized Lactated Ringers was used as a prime.

Resistance to blood flow rose approximately 300% within 30 minutes in all of the control group profusions and platalets fell 70–80% over this period. In the study group, there were no rises in resistance to blood flow over a 24 – 72 hour period, despite normal clotting times after the sixth by-pass hour. A membrane lung of the study group tested after 72 hours of perfusion still exchanged 50 cc $O_2$ with 41 cc $CO_2/m^2$ min. with overflow blood oxygen saturation of over 95%. Platelets from the tested membrane lung (approximately 1 million/mm³) did not fall during the initial 3-hour by-pass and fell less than 25% by the 6th hour.

These test results further indicate the superior hemotologic characteristics of the FFSR coated surfaces compared to those of the standard SSR surfaces.

It will be obvious to those skilled in the art that various changes may be made without departing from the scope of the invention and the invention is not to be considered limited to what is described in the specification.

What is claimed is:

1. In an artificial membrane lung having blood contacting surfaces, including a pair of spaced silicone rubber membranes formed of silica filled silicone, the improvement wherein said silica filled silicone rubber is coated with a polydimethylsiloxane gum having no silica filler.

2. The use of a polydimethylsiloxane gum having no silica filler in accordance with claim 1 as a coating for hypothrombogenic surfaces.

3. The use as recited in claim 2 wherein said hypothrombogenic surfaces are the blood contacting surfaces of a membrane lung.

4. A process comprising bringing into contact with blood a medical device made from a silica filled silicone rubber membrane coated with a blood contacting surface film consisting essentially of silicone elastomer and being free of silica filler, whereby said device functions with improved blood compatibility.

5. A process in accordance with claim 4, wherein said blood contacting surface consists essentially of polydimethylsiloxane.

6. In a process comprising passing a body fluid containing a biologically active material through an artificial member, the improvement comprising:
  improving thromboresistance of said artificial member to the body fluid by using as such member a substrate coated with a silicone elastomer film having no silica filler, said film serving as a hypothrombogenic surface.

7. A process in accordance with claim 6 for adding to or removing from said body fluid said biologically active material by dialysis, and wherein said artificial member comprises an artificial membrane through which said dialysis occurs by passing the body fluid over one side of the membrane so that the biologically active material diffuses through the membrane.

* * * * *